United States Patent
Pasha et al.

(10) Patent No.: US 8,533,119 B2
(45) Date of Patent: Sep. 10, 2013

(54) VALUE TRANSFER WITH IDENTITY DATABASE

(75) Inventors: Amer Pasha, Karchi (PK); Amyn Laasi, Karachi (PK); Elena Gladkaya, London (GB); Bharatkumar Patel, Dubai (AE); Sachin Bountra, Dubai (AE)

(73) Assignee: Visa International Service Association, San Francisco, CA (US)

( * ) Notice: Subject to any disclaimer, the term of this patent is extended or adjusted under 35 U.S.C. 154(b) by 186 days.

(21) Appl. No.: 12/908,541

(22) Filed: Oct. 20, 2010

(65) Prior Publication Data

US 2011/0320355 A1    Dec. 29, 2011

Related U.S. Application Data

(60) Provisional application No. 61/359,791, filed on Jun. 29, 2010.

(51) Int. Cl.
*G06Q 40/02* (2012.01)
(52) U.S. Cl.
USPC ............ 705/44; 705/1; 705/400; 705/401; 705/414; 709/206; 709/248
(58) Field of Classification Search
USPC ........... 705/1, 400, 414, 401, 26.1; 709/206; 709/248
See application file for complete search history.

(56) References Cited

U.S. PATENT DOCUMENTS

| | | | |
|---|---|---|---|
| 5,963,647 A * | 10/1999 | Downing et al. | 705/39 |
| 7,130,865 B2 | 10/2006 | Moore | |
| 7,568,615 B2 | 8/2009 | Corona et al. | |
| 2005/0021366 A1 * | 1/2005 | Pool et al. | 705/1 |
| 2006/0095375 A1 * | 5/2006 | Doyle et al. | 705/44 |
| 2006/0191995 A1 | 8/2006 | Stewart et al. | |
| 2006/0287953 A1 * | 12/2006 | Chauhan | 705/39 |
| 2008/0029591 A1 * | 2/2008 | Levinas et al. | 235/379 |
| 2008/0140568 A1 * | 6/2008 | Henry | 705/40 |
| 2009/0106149 A1 * | 4/2009 | Bennett et al. | 705/42 |
| 2009/0112754 A1 | 4/2009 | Seifert et al. | |
| 2010/0044430 A1 | 2/2010 | Song et al. | |

OTHER PUBLICATIONS

Interfax Hungary Business Weekly, Hungary Business Report Weekly , NA, Dec. 21, 2007.*
International Search Report and Written Opinion in PCT/US2011/042214, mailed Mar. 8, 2012, 9 pages.

* cited by examiner

*Primary Examiner* — Tien Nguyen
(74) *Attorney, Agent, or Firm* — Kilpatrick Townsend & Stockton LLP

(57) ABSTRACT

A value transfer system and methods are disclosed. A sending entity may initiate a cross-border value transfer by authenticating with an authentication system, where the authentication system communicates with an identity database populated with profiles for the sending entity and a recipient entity that contain government data, where the government data is used in the authentication process.

20 Claims, 5 Drawing Sheets

VALUE TRANSFER WITH IDENTITY DATABASE

CROSS-REFERENCES TO RELATED APPLICATIONS

The present non-provisional application claims the benefit under 35 U.S.C. §119(e) of U.S. Provisional Patent Application No. 61/359,791, entitled "AFT/OCT Solution Using Processing Service," filed Jun. 29, 2010, the entire disclosure of which is incorporated herein by reference in its entirety for all purposes.

BACKGROUND

Globalization has increased the mobility of both monetary and human capital. Many workers from emerging markets work abroad and remit money back into a recipient nation. A favorable exchange rate may allow sojourning workers to remit money to support their families in amounts which may exceed their domestic earning potential. In some instances, inbound remittances may constitute a significant portion of the recipient nation's GDP and can be valued in aggregate at several billion dollars per year.

Existing channels for inbound remittances may be informal and privately operated. These channels may be susceptible to attacks or fraud, may charge unfair rates or present unreliable service, and may also be used to launder money and support illicit operations. Informal channels also do not provide the recipient nation insight or control over an important segment of the economy. Informal channels of inbound remittances, such as cross-border value transfers, may introduce risk into a significant amount of a nation's income. Moreover, established value transfer systems and payment processing systems, which may address shortcomings of the informal channels, may be wary of cross-border value transfers due to the higher probability of fraud and increased risk, especially in card not present/cash not present transactions. Facilitating faster, cheaper, safer, more convenient, secure, and efficient operations may increase the flow of inward remittances into the recipient nation.

Thus, there is a need in the art for a formalized value or money transfer system that addresses the above concerns. Embodiments of the invention address these and other problems, individually and collectively.

BRIEF SUMMARY

Embodiments of the invention disclosed herein include systems, technical architecture of the systems, and methods for value transfer with an identity database. A value transfer with an identity database system can be implemented using one or more computer apparatuses and databases.

One embodiment of the invention is directed to a system and method for receiving a value transfer request message from a host bank, the value transfer request message communicated by the host bank after the host bank receives value transfer data comprising a transfer amount, originating from a sending entity, the value transfer data being received by the host bank after the sending entity is authenticated by a government authentication system, sending a debit transaction message to the sending entity's issuing bank to debit at least the transfer amount from a sending entity account, receiving verification of the debit transaction, and sending a deposit transaction message to a recipient entity's issuing bank to deposit the transfer amount to a recipient entity account.

Another embodiment of the invention is directed to a method wherein the government operated authentication system receives a value transfer request message from the sending entity to transfer money to the recipient entity, and authenticates the value transfer request message by verifying that the recipient entity has a profile in a government identity database and resides in a nation operating the government authentication system. The value transfer request message can be a value transfer request message.

Another embodiment of the invention is directed to a method further comprising authenticating the value transfer request message by verifying that the recipient entity is listed as a recipient under the sending entity's profile and that the recipient entity is a family member of the sending entity.

Another embodiment of the invention is directed to a method further comprising verifying the value transfer request message by checking if the value transfer request exceeds velocity limits for the sending entity.

Another embodiment of the invention is directed to a method further comprising verifying the value transfer request message by checking if the value transfer request exceeds value limits for the transaction.

Another embodiment of the invention is directed to a method further comprising verifying the value transfer request message by checking if the sending entity is blacklisted.

DETAILED DESCRIPTION

Figure 1:
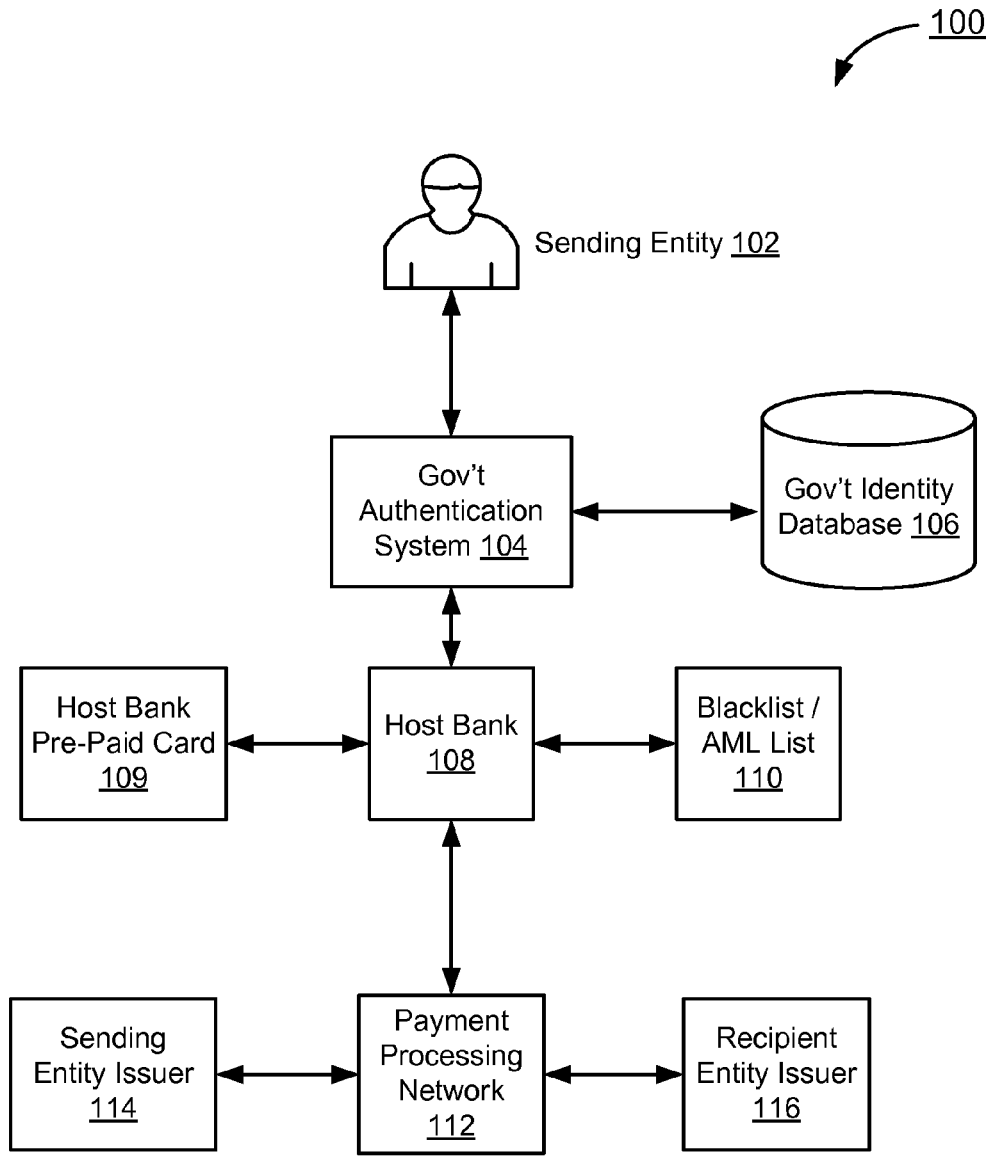
FIG. 1 is a value transfer with an identity database system, according to an example embodiment.

Embodiments of the invention are directed to systems, architectures of the systems, and methods for conducting a value transfer with an identity database. In other embodiments, the value transfer process need not be a cross-border money in nature, but it could be entirely within the borders of a single nation. In a further embodiment, a money transfer may be a cross-border money transfer.

The system can support cross-border value transfers where a sending entity transfers money to a recipient entity. Both the sending entity and recipient entity may be citizens, nationals, have an official status, or be registered with a recipient nation. The recipient nation may be the nation into which the cross-border value transfer funds are being sent to or where the recipient entity's issuing bank or receiving account is hosted. Although the term "recipient nation" may entail a single nation, the term recipient nation may refer to a single nation or a group, alliance, or consortium of nations, e.g, the European Union, the Gulf Coast Consortia. The sending entity may reside in a country other than the recipient nation or may send money from an account originating from a nation other than the recipient nation. In an example embodiment, the sending entity's issuing bank may be in a country other than the recipient nation. In a further embodiment, the recipient entity's issuing bank may be in the recipient nation. The recipient entity may reside in or have an account in the recipient nation. For example, a sending entity and a recipient entity may be citizens of Pakistan where the sending entity works in the United Arab Emirates and may send money from a United Arab Emirate bank to the recipient entity that lives in and has a bank with a receiving account in Pakistan. In an example embodiment, the sending entity may be an individual who is issued a Computerised National Identity Card for Overseas Pakistanis ("CNICOP") card by the government of Pakistan. In a further embodiment, the recipient entity may be an individual who is issued a Computerised National Identity card ("CNIC") by the government of Pakistan.

A government identity database can include a database that may contain data about citizens, nationals, those that have an official status, or are registered with the recipient nation, such as sending and recipient entities. In an example embodiment, the government of the recipient nation may operate, host, fund, or facilitate the government identity database. The data stored in the government identity database may include data describing the identity of an individual and data relating to an individual's remittances, such as preferences and settings. In an example embodiment, identity data may describe name, address, age, identification number, biometric data, contact information, know your customer information, confirmation questions and answers and family tree data ("familial data"). The remittance data may comprise of transaction history, recipient list, bank information, accounts, fraud/anti-money laundering ("AML"), and authentication data. The data stored in the government identity database may be gathered, for example, from official government documents such as birth records, citizenship records, tax records, licensing records, and other sources, or gathered during a registration process.

A government authentication system is an authentication system that may support value transfers by authenticating the sending entity and recipient entity and verifying their identity, status, and relationship, among other potential data points, using the data stored in the government identity database. In a further embodiment, the government of the recipient nation may operate, host, or facilitate the government authentication system. By authenticating a sending entity and recipient entity through a government identity database and a government authentication system, the likelihood of fraud is lowered because the available user data is richer and more complete, and enforcement may be linked with government services and powers. Thus, large, reliable, and efficient payment processing networks may support cross-border value transfers. In addition, the government authentication system provides the government insight into value transfers.

The government authentication system may provide a user-facing interface. In an example embodiment, users may interface with the government authentication system via phone, interactive voice response ("IVR") systems, web page, agent, or a specialized software application. The government identity database and government authentication system may have access to information that traditional authentication systems may not have access to, such as familial data, driver's license records, biometric data, government records, criminal records, tax records, voting records, and blacklists. Embodiments of the invention may include one or more of such types of data in a database. In addition, fraudulent behavior, money laundering, and other risks to the value transfer system may also be tracked and handled by the government of the recipient nation. In an example embodiment, a government authentication system that detects fraud, may enforce repayment by utilizing other government methods, such as leveling civil fines, garnishing wages, reducing government services, or threatening criminal prosecution. In an example embodiment, the government identity database may be a database operated by the National Database and Registration Authority ("NADRA") of Pakistan. In a further embodiment, the government authentication system may be a system operated by the Pakistan Remittance Initiative ("PRI").

In an example embodiment, the government authentication system may register the sending entity and recipient entity with the value transfer system. The government authentication service may store sending entity and recipient entity value transfer preferences and settings in the government identity database. In an example embodiment, the government identity database may store a transaction history, fraud/AML data, bank and account data, authentication data, and a list of approved recipient entities. The value transfer system may facilitate value transfers between registered users. In an example embodiment, the value transfer system may be available only to registered users.

The registration information captured by the government authentication system may also be shared with a payment processing network and/or a host bank, so that sending entities and recipient entities registered with the government authentication system are also registered with the payment processing network and/or the host bank. The registration data may be communicated via APIs or via a communications network. The host bank and payment processing network may verify the registering entities, by comparing the received registrant information against blacklists and AML lists, such as the Office of Foreign Asset Control Specially Designated Persons and Blocked persons list and other government or industry produced blacklists, such as a Government of Pakistan blacklist. In an example embodiment, the registration process with the government authentication system completes only if the payment processing network and/or the host bank acknowledges the acceptance of the registering entity.

In an example embodiment, a value transfer may be initiated by a sending entity that contacts the government authentication system. The government authentication system may access the government identity database to verify the identity of the sending entity and the recipient entity. After the sending entity and recipient entity have been authenticated by the government authentication system, the sending entity may interact with the host bank that supports value transfer functionality. In an example embodiment, the sending entity is redirected to the host bank by the government authentication system. In one embodiment, the host bank may support a particular corridor, such as value transfers from the UAE to Pakistan. In an example embodiment, the host bank may perform additional fraud and anti-money laundering checks. In a further embodiment, the host bank may be a bank that resides within the recipient nation. The government authentication system may also communicate with the host bank.

The host bank may support value transfer functionality and communicate with a payment processing network to enable the value transfer. In an example embodiment, the payment processing network may send a debit transaction message to the sending entity's issuing bank. If the debit operation is successful, then a domestic deposit transaction message may be sent by the payment processing network to the recipient entity's issuing bank. In a further embodiment, the payment processing network may conduct various fraud/AML checks, and may enforce value transfer limits, such as velocity and value restrictions. In an example embodiment, the value transfer occurs in real time. In a further embodiment, the value transfer may occur within a day, week, or other time period.

In an example embodiment, the value transfer transfers funds/money between portable consumer devices (or accounts associated with portable consumer devices). A portable consumer device may be a credit card, a debit card, a mobile phone, a pre-paid card, or any portable device capable of funding a value transfer. In an example embodiment, a value transfer is a transaction that transfers funds/money from one account to another account. In an example embodiment, a value transfer may transfer funds from one credit/debit card account to another credit/debit card account. In a further embodiment, the accounts may be associated with a mobile device, such as a mobile phone or a smart card. In an example embodiment, the accounts may be associated with a payment processing network and/or held by issuing entities or banks.

In an example embodiment, portable consumer devices may be associated with sensitive information, such as a credit card expiration date, a CVV2, or a personal account number ("PAN"), also commonly referred to as a permanent account number or a primary account number. In an example embodiment, aliases may be used to identify a sending entity or a recipient entity in a value transfer to preserve privacy and reduce the likelihood of fraud associated with sharing sensitive information. In an example embodiment, an alias may be an alpha-numeric value, such as a username. In a further embodiment, an alias may be a verifiable value, such as a phone number or an email address. For example, a value transfer transaction may send money to the alias "ted@ted.com" rather than to a credit card or bank account number. Portable consumer devices may also be registered with the national identity database and be associated with authentication information, such as a password, when interfacing with the government authentication system.

In an example embodiment, if the recipient entity does not have a portable consumer device, then a pre-paid portable consumer device may be delivered to the recipient entity in the amount of the value transfer. In a further embodiment, if the sending entity does not have a portable consumer device, a pre-paid portable consumer device may be issued to the sending entity to facilitate a value transfer. In an example embodiment, a sending entity issuer in a nation other than the recipient nation issuers the pre-paid card.

Other specific examples of embodiments of the invention are described in further detail below.

I. System

FIG. 1 is a value transfer with an identity database system 100, according to an example embodiment. The value transfer system 100 comprises a sending entity 102, a government authentication system 104, a government identity database 106, a host bank 108, a host bank pre-paid card 109, a blacklist/AML list 110 (the list may be stored as code in a database), a payment processing network 112, a sending entity issuer 114, and a recipient entity issuer 116.

The sending entity 102 may possess a consumer device. In an example embodiment, the portable consumer device may be a credit card, a debit card, a mobile phone, a mobile device, a pre-paid device, a portable computation device running a specialized application, or a portable object that allows a sending entity to effectuate a value transfer.

The sending entity 102 may communicate with the government authentication system 104 to initiate a value transfer to the recipient entity. The sending entity 102 may also communicate with the government authentication system 104 to register. In an example embodiment, the sending entity 102 may communicate with the government authentication system 104 via telephone, IVR, a website, a communications channel such as the Internet or an intranet, an agent, or a specialized software application residing on a client computer. In an example embodiment, the sending entity 102 may communicate an authentication request message to the government authentication system 104. The government authentication system 104 receives the sending entity's 102 authentication request and may authenticate the sending entity 102. The value transfer request message and/or the request to authenticate may include transfer details, such as the transfer amount and data identifying the sending and recipient entities, their respective accounts, portable consumer devices, aliases, PANs or BINs, and authentication data, such as a login and password. Also included may be information relating to or identifying the sending entity issuer 114. In an example embodiment, the sending entity 102 may provide their name, the identification number, or a CNIC identifier. The government authentication system 104 may communicate with the sending entity 102 to authenticate the sending entity 102.

The government authentication system 104 may query the government identity database 106 for profile data relating to the sending entity 102 and the recipient entity. The government authentication system 104 may communicate with the government identity database 106 via the internet, an intranet, a mobile network, an agent, or a communications network. The government identity database 106 may receive the data query from the government authentication system 104 and respond to the government authentication system 104 with the requested sending entity 102 and recipient identity profile data. Upon receiving the sending entity 102 and recipient entity profile data, the government authentication system 104 may authenticate the sending entity 102 and the transfer details against the profile data received from the government identity database 106. In an example embodiment, the government authentication system 104 may also compare the transfer details against a blacklist/AML list.

Upon authenticating with the government authentication system 104, the sending entity 102 communicates with a host bank 108. The sending entity 102 may communicate with the host bank 108 via the Internet, an intranet, a mobile network, an agent, a phone, an IVR network, or a communications network. In an example embodiment, the sending entity 102 is directed to the host bank 108 by the government authentication system 104. The host bank 108 may be a bank that supports value transfer functionality. In an example embodiment, the host bank 108 may be a bank designed to cooperate with the government authentication system 104 to effectuate value transfers. In an example embodiment, the government authentication system 104 communicates with the host bank 108 to verify that the sending entity 102 has been authenticated and may also transmit auxiliary data to the host bank 108. The sending entity 102 may communicate a value transfer request message to the host bank 108. The value transfer request message may comprise of data identifying the transfer amount, a transfer schedule, sending entity issuer, the recipient entity issuer, the sending and recipient entities, their respective portable consumer devices, aliases, or PANs, and the host bank 108 bank identification number ("BIN").

The host bank 108 may receive the value transfer request message. In an example embodiment, the host bank 108 many conduct additional verification checks, such as comparing the transfer details against a blacklist/AML list 110. If the host bank 108 verifies the sending entity 102 and the value transfer, the host bank 108 may communicate a value transfer command to the payment processing network 112 to effectuate the value transfer.

Upon receiving the value transfer command from the host bank 108, the payment processing network 112 may analyze the received data and determine if the value transfer demand is valid. The payment processing network 112 may communicate with the host bank 108 via phone, IVR, a website, an agent, or a specialized application. In an example embodiment, the payment processing network 112 may enforce velocity and value limitations on sending entities or recipient entities. For example, the payment processing network 112 may limit the amount of money a sending entity 102 may send in a month. For example, the payment processing network 112 may limit the amount of money that may be sent in a month to $10,000, or limit the number of transactions per month. A similar limitation may limit how much money a recipient entity may receive. In addition, the payment processing network 112 may enforce maximum and minimum transfer value amounts, such as restricting value transfers to less than a thousand dollars and more than ten dollars per transaction. In an example embodiment, value and velocity check values may change over time or due to a user's risk assessment, such that a maximum velocity and value may increase due to good behavior and passage of time.

If the payment processing network 112 verifies the sending entity, then a debit transaction message is sent from the payment processing network 112 to the sending entity issuer 114. The payment processing network 112 may communicate with the sending entity issuer 114 via phone, IVR, a website, an agent, or a specialized application. The sending entity issuer 114 may receive the debit transaction message and determine if it is valid. For example, the sending entity issuer 114 may check if the sending entity 102 is authorized to conduct value transfers and if there are sufficient funds in their account. Upon the sending entity issuer 114 authorizing the debit transaction, the sending entity issuer 114 sends a debit verification message to the payment processing network 112. In an example embodiment, the debit transaction message is an account funding transaction.

Upon the payment processing network 112 receiving the debit verification message from the sending entity issuer 114, the payment processing network 112 then sends a deposit transaction message to the recipient entity issuer 116. The payment processing network 112 may communicate with the recipient entity issuer 116 via phone, IVR, a website, an agent, or a specialized application. Upon the recipient entity issuer 116 receiving the deposit transaction message the recipient entity issuer 116 responds to the payment processing network 112. If the recipient entity issuer 116 verifies the deposit, then it sends a deposit verification message to the payment processing network 112. If the deposit cannot be verified, then the recipient party issuer 116 sends a deposit rejection message to the payment processing network 112. If the deposit is rejected, then the payment processing network 112 further communicates with the sending entity issuer 114 to undo the former debit transaction. In an example embodiment, the deposit transaction message is an original credit transaction.

In an example embodiment, if the recipient entity does not have an existing account with an issuer, the host bank 108 may issue a pre-paid card 109 for the transaction amount and deliver it to the recipient entity.

In embodiments of the invention, the payment processing network 112 may comprise a server computer (which may comprise one or more computer apparatuses) comprising a processor, and a computer-readable medium coupled to the processor. The computer readable medium comprising code executable by the processor for implementing a method comprising: receiving a value transfer request message from a host bank 108, the value transfer request communicated by the host bank 108 after the host bank 108 receives value transfer data comprising a transfer amount, originating from a sending entity 102, the value transfer data being received by the host bank 108 after the sending entity 102 is authenticated by a government authentication system 104, sending a debit transaction message to the sending entity's issuing bank 114 to debit at least the transfer amount from a sending entity account; receiving verification of the debit transaction; and sending a deposit transaction message to a recipient entity's issuing bank 116 to deposit the transfer amount to a recipient entity account.

Figure 2:
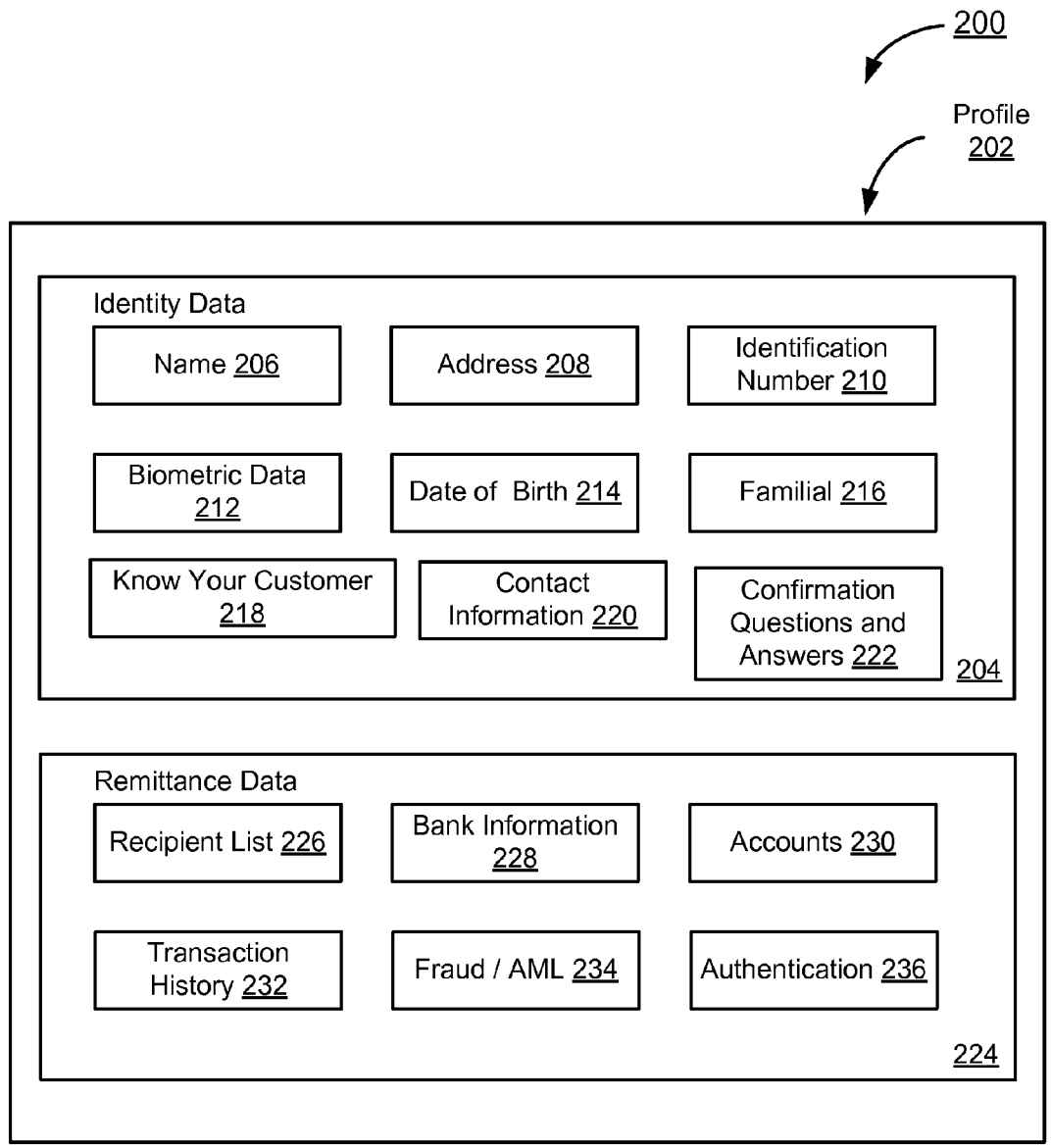
FIG. 2 is a data model of a user profile in a value transfer with an identity database system, according to an example embodiment.

FIG. 2 is a data model of a user profile in a value transfer with an identity database system 200, according to an example embodiment. A user profile 202 may be stored in a government identity database 106. The government identity database 106 may have a user profile 202 for every citizen, national, person with an official status, or person registered with the recipient nation. The user profile 202 may store identity data 204 and remittance data 224.

Identity data 204 is data that may be used to authenticate the identity of an individual or user. In an example embodiment, identity data 204 may comprise of name 206, address 208, identification number 210, biometric 212, date of birth 214, familial 216, know your customer 218, contact information 220, and confirmation questions and answers 222 data. In an example embodiment, name data 206 may describe one or more names of the user, e.g., former names. Address 208 data may describe one or more addresses of the user, e.g., work address, past addresses, second address. Identification number data 210 may describe an identification number assigned to the user, such as a passport, license, social security, CNIC, or equivalent number. Biometric data 212 may describe biological based identification means, such as fingerprint, face recognition, DNA, palm print, retina scan, or other data. Familial data 216 may describe the familial relationships between registered users of the government identity database. For example, familial data 216 may describe a mother-son relationship between two registered users, or other familial relationships, e.g., cousins, in-laws, children, etc. Know your customer data 218 may describe data relevant to bank monitoring of individuals in relation to AML efforts, combating the financing of terrorism, and may also include suspicious activity recording. In general, know your customer data 218 may record activities that may be reported to and be of interest to the Financial Crimes Enforcement Network or the Serious Organised Crime Agency. Know your customer data 218 may also conform to international or national standards. Contact data 220 may describe methods to contact a registered user, such as email address, phone numbers, mailing address, work address, etc. Confirmation question and answers data 222 describe a serious of questions for which the registered user has already provided answers for, such as "what is the name of your high school?" The questions may be presented and a provided answer can be checked against the confirmation questions and answers data 222 to authenticate a user.

Remittance data 224 describes the value transfer settings, preferences, history, and other details of a registered user. The remittance data 224 may comprise of recipient list data 226, bank information data 228, accounts data 230, transaction history data 232, fraud/AML data 234, and authentication data 236. Recipient list 226 data may describe the list of registered users a sending entity may transfer funds to. In an example embodiment, value transfers may be limited to only registered users listed in a sending entity's 102 recipient list data 226. In an example embodiment, providing a recipient list may be a required step of user registration. In another embodiment, the members of the recipient list may be limited to family members, such as described in the familial data 216. In another embodiment, the number of entries in the recipient list may be limited to a predefined number. For example, the recipient list may be limited to three family members. The bank information 228 data may describe the issuing bank of the user. The account data 230 may describe accounts, such as bank accounts, mobile accounts, stored value account, or other value holding account held by the user. The account data 230 may describe the PAN, BIN, and/or alias data related to the account from which the funds for the value transfer may be sent from. Transaction history 232 data may describe the history of past value transfers—either in the capacity as a sending or receiving entity. The transaction history 232 data may be used to enforce velocity or value limitations. Fraud/AML data 234 may describe the risk of a particular user in terms of fraudulent of money laundering activity 234. Authentication data 236 may describe a username/password or other data that may be used by the user to authenticate.

II. Method

Figure 3:
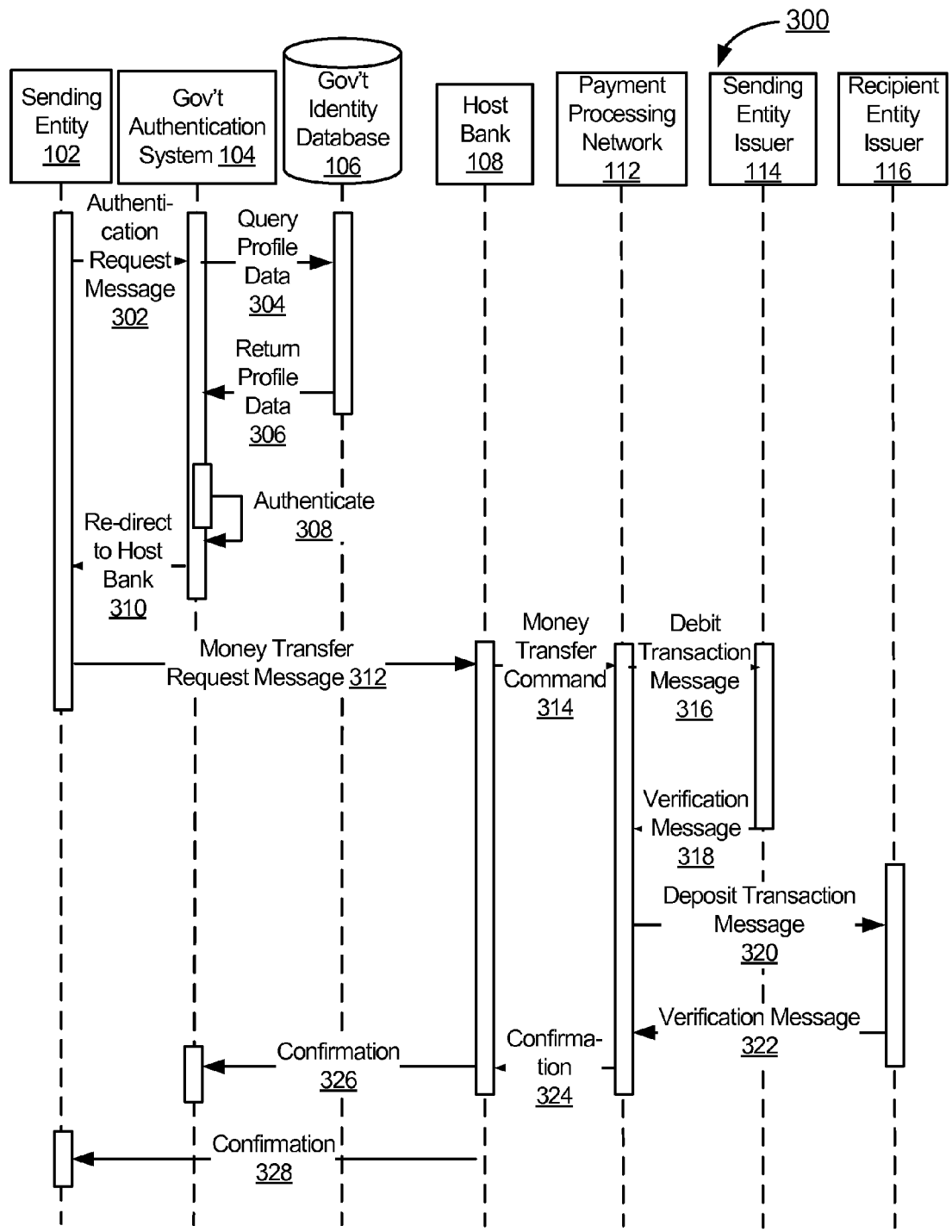
FIG. 3 is process flow of a value transfer with an identity database, according to an example embodiment.

FIG. 3 is process flow of a value transfer with an identity database 300, according to an example embodiment. At operation 302 the sending entity 102 communicates with the government authentication system 104 to initiate an authentication request. The sending entity 102 may communicate with the government authentication system 104 via phone, IVR, a website, an agent, or a specialized application. The sending entity 102 may send an authentication request message to the government authentication system 104. The sending entity's 102 communication to the government authentication system 104 may comprise data identifying the sending entity 102 and the recipient entity, along with authentication information, such as a login/password. It may also include data such as the transfer amount and the sending and recipient entities accounts or portable consumer devices, aliases, PANs or BINs. The government authentication system 104 receives and analyzes the value transfer request and associated data and authentication information. After receiving the value transfer request, the government authentication system 104 at operation 304 then queries the government identity database 106 for profile data. In an example embodiment, the government authentication system 104 communicates via an agent that uses a computer terminal connected to a communications network to query the government identity database 106. In another embodiment, government authentication system 104 communicates with the government identity database 106 via automated computer systems. The requested profile data may include the profile of the sending entity 102 and the recipient entity, and may include both identity data and remittance data. The government identity database 106 may receive the query, look up the information, and return the profile data to the government authentication system 104 at operation 306. In an example embodiment, operations 302, 304 and 306 may be iterated, so that returned profile data in operation 306 may be displayed to the sending entity 102, who can send additional authentication data to the government authentication system 104. For example, the returned profile data in operation 306 may include confirmation questions and answers data 222, where the question may be presented to the sending entity 102 which may return an answer to the government authentication system 104, and be verified against the value stored with the government identity database 106.

At operation 308, the government authentication system 104, after it receives the profile data from the government identity database 106, may authenticate the sending entity 102. In an example embodiment, the government authentication system 104 authenticates the sending entity by analyzing the sending entity's profile data received from the government identity database 106. For example, the government authentication system 104 may ask the sending entity to provide authentication data, such as their home address, their father's name, or other information. The government authentication system 104 may then verify that the sending entity 102 provided authentication data matches the value stored in the government identity database 106. In an example embodiment, the government authentication system 104 may also verify that the sending entity is valid. For example, the government authentication system 104 may verify that the recipient entity is listed among the sending entity's recipient list 226, and is otherwise not blacklisted or ineligible for value transfers. In an example embodiment, the government authentication system 104 may also enforce blacklists/AML lists, and fail an authentication request if either the sending entity 102 or the recipient entity is found on the lists. In a further embodiment, the government authentication system 104 may enforce velocity or value checks, such as limiting the number of value transfers a sending entity 102 may send in a period of time, and limiting the aggregate amount of money the sending entity 102 may send in a period of time.

After the sending entity 102 is authenticated by the government authentication system 104, the sending entity 102 is directed to a host bank 108 at operation 310. In an example embodiment, an agent of the government authentication system 104 may forward the sending entity's phone call to a host bank's agent. In another embodiment, the sending entity 102 is directed from a government authentication system 104 website/application to a host bank website/application. In another embodiment, data sent from the sending entity 102 is routed to the host bank 108. The government authentication system 104 may also transfer data to the host bank 108 while the sending entity 102 is directed to the host bank 108. The government authentication system 104 may send a confirmation of authentication, as well as details of the authentication request to the host bank 108. For example, the government authentication system 104 may send all the authentication request data to the host bank 108, so that the sending entity 102 does not have to reenter duplicative information.

At operation 312 the sending entity 102 sends a value transfer request message to the host bank 108. The same data may be sent by the government authentication system 104 to the host bank 108. The value transfer request data may describe the sending and recipient entities, the amount of the value transfer, the currency, the delivery schedule, and auxiliary data. Also included may be data describing a transfer schedule, sending and recipient entity's aliases, PANs, and BINs. Upon receiving the value transfer request message, the host bank 108 may analyze the content and verify the transaction. In an example embodiment, the host bank 108 may compare the sending and recipient entity data against a blacklist/AML list and may conduct a risk assessment of the transaction. If the host bank 108 verifies the transaction, then at operation 314 the host bank 108 communicates a value transfer command to the payment processing network 112. In an example embodiment, the host bank 108 may support a particular corridor, such as value transfers from the UAE to Pakistan. In an example embodiment, the host bank 108 may be a bank that resides within the recipient nation. In a further embodiment, only a sending entity portable consumer device issued within supported corridors may be used. Further, the sending entity 102 may need to register a phone number from a nation in the supported corridor.

Upon receiving the value transfer command from the host bank 108, the payment processing network 112 may conduct various blacklist/AML list and value/velocity checks against the sending entity 102 and the transaction. If the value transfer command is verified, the payment processing network 112 then communicates a debit transaction message to the sending entity issuer 114. Upon receiving the debit transaction message, the sending entity issuer 114 analyzes the message and verifies that the sending entity account supports value transfer and that there are sufficient funds in the account to fund the value transfer. The sending entity issuer 114 may also conduct various fraud and risk checks, including a blacklist check. In an example embodiment, the debit transaction message is an account funding transaction. If the debit account message is successful in debiting from the sending entity issuer, then the sending issuer 114 sends a verification message to the payment processing network 112 at operation 318. If the debit transaction message was unsuccessful in debiting from the sending entity issuer, then a failure message is sent to the payment processing network 112. In an example embodiment, the sending entity issuer 114 is in a country other than the recipient nation, so the value transfer is cross-border into the recipient nation.

Upon receiving the verification message from the sending entity issuer 114, the payment processing network 112 then communicates a deposit transaction message to the recipient party issuer 116. Upon receiving the deposit transaction message, the recipient issuer 116 analyzes the message and verifies that the recipient entity account supports value transfer and is able to accept the deposit. The recipient entity issuer 116 may also conduct various fraud and risk checks, including a blacklist check. In an example embodiment, the deposit transaction message is an original credit transaction. If the credit transaction message is successful in depositing into the recipient entity issuer 116, then the recipient party issuer 116 sends a verification message to the payment processing network 112 at operation 322. If the deposit transaction message was unsuccessful in depositing into the recipient entity issuer 116, then a failure message is sent to the payment processing network 112 and the debit from the sending entity issuer 114 is undone. In an example embodiment, the value transfer may occur in real time. In another embodiment, the value transfer may occur within a day or other pre-set period of time. The payment processing network 112 may also analyze the value transfer and include a value transfer fee, based on the provided value transfer data. In an example embodiment, the verification messages may be sent to the sending and recipient entities via SMS.

Upon receiving the deposit message acknowledgement from the recipient party issuer 116, the payment processing network 112 may communicate a confirmation message to the host bank 108, confirming the successful value transfer, at operation 324. Upon the host bank 108 receiving the confirmation from the payment processing network 112, the host bank 108 may send a confirmation message to the government authentication system 104 and the sending entity 102, at operation 326 and 328.

In an example embodiment, a chargeback transaction, for example, due to a user claiming that they did not initiate the value transfer, may result in an investigation of the sending and recipient entity. This may result in the blacklisting of the sending and/or the recipient entity with the payment processing network 112, the government authentication system 104, the host bank 108, and the Government of Pakistan.

Figure 4:
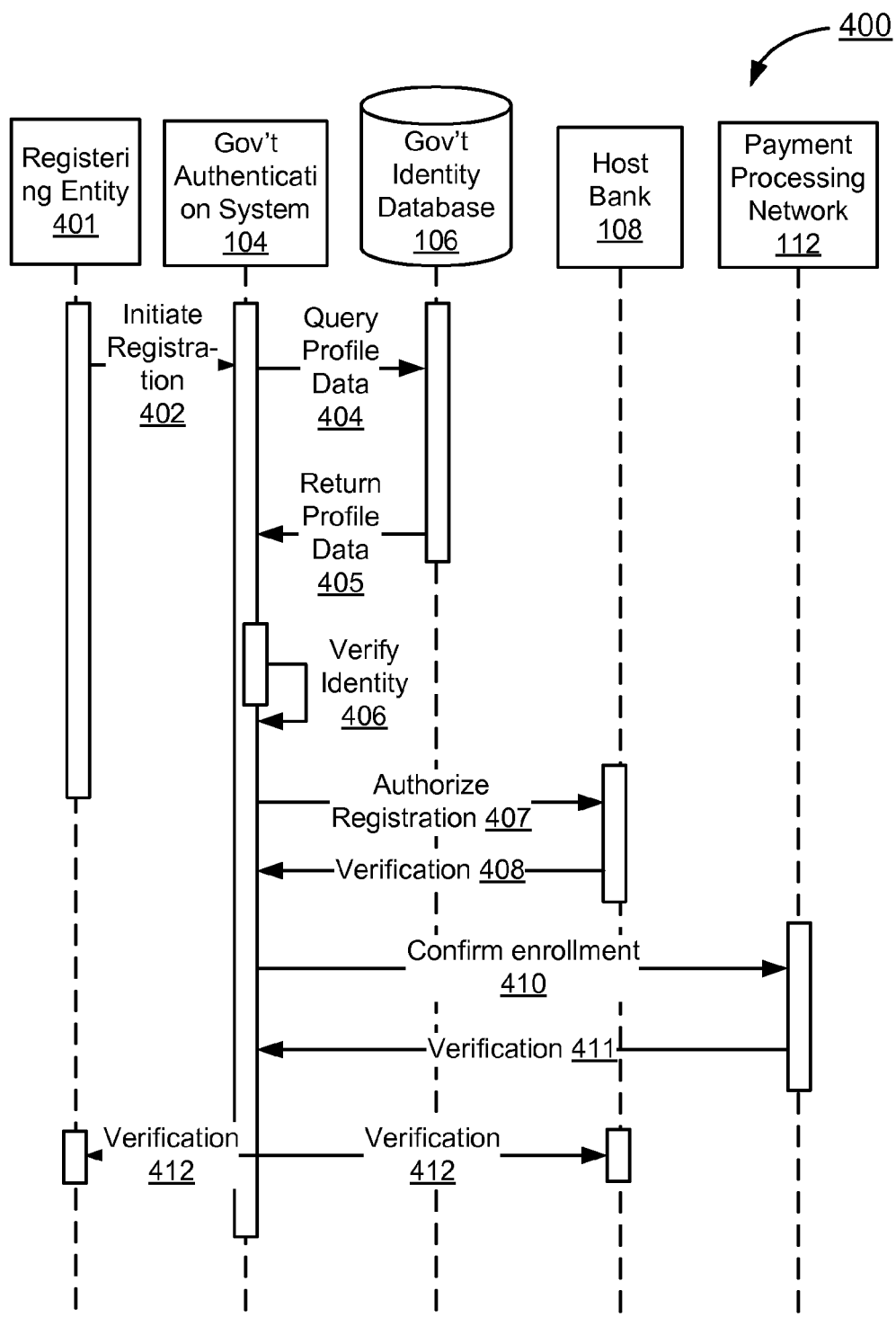
FIG. 4 is a process flow of a user registration in a value transfer with an identity database system, according to an example embodiment.

FIG. 4 is a process flow of a user registration in a value transfer with an identity database system 400, according to an example embodiment. This process may describe the steps a user may take to register with a value transfer system. In an example embodiment, a user must register with the value transfer system in order to use it as either a sending entity or a recipient entity. At operation 402 the registering entity 401 initiates the registration with the government authentication system 104. The registering entity 401 may communicate with the government authentication system 104 via telephone, IVR, a website, a communications channel such as the internet or an intranet, an agent, or a specialized software application. In an example embodiment, the registering entity 401 may communicate an initiate registration message to the government authentication system 104. The registering entity 401 may communicate registration information, such as their name, address, identification number, or other identifying information to the government authentication system 104. The registration information may also include portable consumer device information, such as a PAN, CV2 value, alias, and BIN. Upon receiving the registration information from the registering entity 401, the government authentication system 104 analyzes the information. The government authentication system 104 may then query the government identity database 106 to check if a user profile matches the information provided in the registration data, in operation 404. At operation 405, matching profile data is returned to the government authentication system 104 from the government identity database 106. At operation 406, the government authentication system 104 analyzes the profile data and the registration data. This operation may both verify that the registering entity 401 is a citizen, national, has a status with, or is registered with the government identity database 106. In an example embodiment, if a matching user profile is found in the government identity database 106, then that profile is then analyzed to see if it is eligible for value transfer. In a further embodiment, if no matching profile is found, then the registration may fail. The government authentication system 104 may then analyze the profile data and may edit it to make the profile eligible for value transfers. In an example embodiment, the government authentication system 104 may compare the profile data against blacklists/AML lists, and reject the registering entity's registration request if the registering entity 401 is found on those lists. The government authentication system 104 may conduct other checks to determine whether to permit the registration of the registering entity 401.

At operation 407 the government authentication system 104 uses the received registering entity 401 profile data and the initiate registration information to query a host bank 108 to determine if the registering entity 401 can be registered. In an example embodiment, the host bank 108 may be assigned to the particular corridor, e.g., UAE to Pakistan. Upon receiving the query request, the host bank 108 may check the received information against a local blacklist/AML list or may conduct risk assessment checks. In operation 408, the host bank 108 returns the results of the registration request. If the host bank 108 verifies the registering entity 401 as not rejected, then the government authentication system 104 continues with the registration process. If the host bank 108 rejects the registering entity 401 registration request, then the registration process ends.

At operation 410, the government identity database sends the registration request to a payment processing network 112. The payment processing network 112 receives the registration request and may conduct its own checks, such as blacklist/AML list checks, as well as fraud and other risk assessments. If the payment processing network 112 verifies the registration request, then in operation 411 the payment processing network 112 sends a verification message to the government authentication system 104. In response, the government authentication system 104 may similarly send a verification message to the host bank 108 and the registering entity 401 to notify them that registration was completed, at operation 417.

The registering entity 401 may update their profile with the government authentication system 401. In an example embodiment, the registering entity 401 may update the users listed in their recipient list. In an example embodiment, there may be number and time restrictions on updating the recipient list, such as limiting the adding/removing of a new user to the list to one action per month, or other time period.

Figure 5:
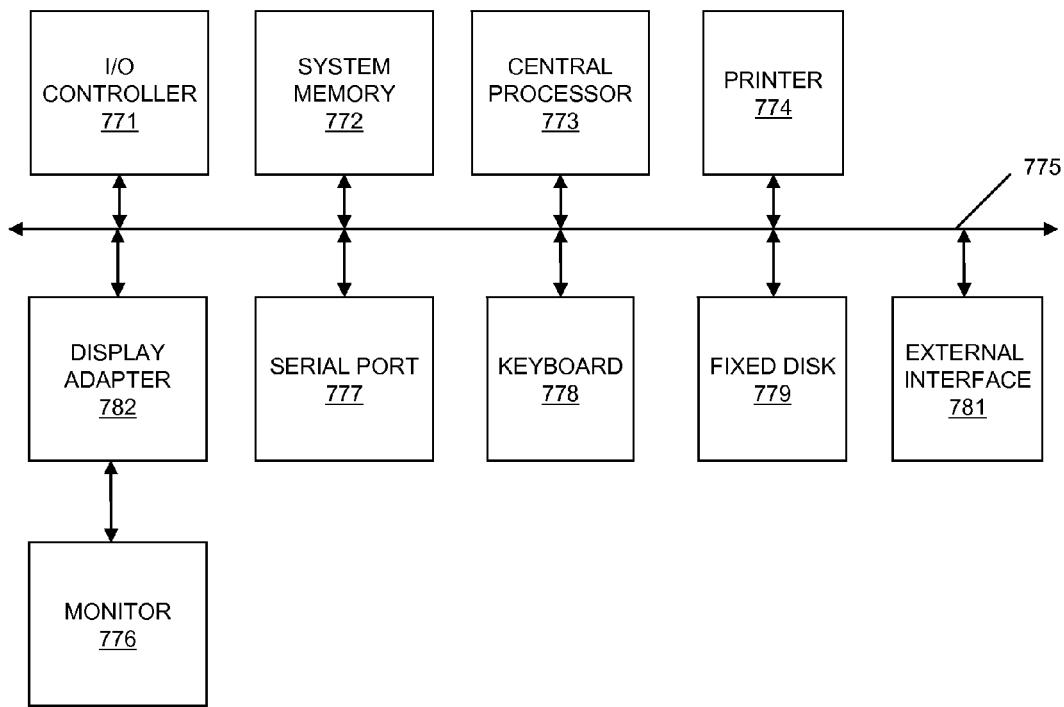
FIG. 5 is a diagram of a computer apparatus, according to an example embodiment.

FIG. 5 is a diagram of a computer apparatus, according to an example embodiment. The various participants and elements in the previously described system diagrams (e.g., the value transfer system, government authentication system, payment processing network, sending entity issuer, recipient entity issuer, etc. in FIG. 1) may use any suitable number of subsystems in the computer apparatus to facilitate the functions described herein. Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer-readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

An account funding transaction may be a transaction initiated by a sending entity issuer or payment processing network on behalf of the sending entity that results in the debit of the sending entity's account. An original credit transaction may be a transaction that results in a credit to a recipient entity's account.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Embodiments of the value transfer system may provide several advantages over existing systems. The use of a government authentication system that accesses a government identity database allows for a authentication of a user with data that is recorded by the government. This data may begin at birth and may be difficult to forge or fake. The data used to authenticate a user is thus more reliable and more difficult to fake. The link to a government system also acts as a deterrent to potential fraudsters, as punishment for abusing the system may be more severe. In addition, having the government authentication system be the first point of contact permits the supporting recipient nations insight and control over their inbound remittances. This reduces the likelihood of money laundering or other abusive practices.

In addition, established payment processing networks, value transfer institutions, and supporting host banks are more likely to support a cross-border value transfer. Partnering with these institutions may provide for a more reliable, cheaper, more efficient and more secure service that may increase the number and amount of inbound remittances.

What is claimed is:

1. A method comprising:
receiving a cross-border money transfer request message from a host bank, wherein a sending entity initiates the cross-border money transfer request by communicating an authentication request to a government authentication system, wherein after the sending entity is authenticated by the government authentication system, the government authentication system directs the sending entity to the host bank, wherein the host bank receives money transfer data comprising a transfer amount for the cross-border money transfer request from the sending entity and an authentication confirmation from the government authentication system;
sending a debit transaction message to the sending entity's issuing bank to debit at least the transfer amount from a sending entity account;
receiving verification of the debit transaction; and
sending a deposit transaction message to a recipient entity's issuing bank to deposit the transfer amount to a recipient entity account.

2. The method of claim 1, wherein the government operated authentication system receives a cross-border money transfer request message from the sending entity to transfer money to the recipient entity, and authenticates the cross-border money transfer request message by verifying that the recipient entity has a profile in a government identity database and resides in a nation operating the government authentication system.

3. The method of claim 2, further comprising the authentication system verifying that identifying information provided by the sending entity matches data in a profile for the sending entity in the government identity database.

4. The method of claim 1 further comprising authenticating the cross-border money transfer request message by verifying that the recipient entity is listed as a recipient under the sending entity's profile.

5. The method of claim 4 further comprising verifying that the recipient entity is a family member of the sending entity.

6. The method of claim 1 wherein if the recipient entity is unbanked, then the original credit transaction is not sent, and instead a prepaid card is delivered to the recipient entity.

7. The method of claim 1 further comprising verifying the money transfer request message by checking if the cross-border money transfer request exceeds velocity limits for the sending entity.

8. The method of claim 1 further comprising verifying the money transfer request message by checking if the cross-border money transfer request exceeds value limits for the transaction.

9. The method of claim 1 further comprising verifying the money transfer request message by checking if the sending entity is blacklisted.

10. A system comprising:
a processor; and
a computer-readable medium coupled to the processor, the computer readable medium comprising code executable by the processor for implementing a method comprising:
receiving a cross-border money transfer request message from a host bank, wherein a sending entity initiates the cross-border money transfer request by communicating an authentication request to a government authentication system, wherein after the sending entity is authenticated by the government authentication system, the government authentication system directs the sending entity to the host bank, wherein the host bank receives money transfer data comprising a transfer amount for the cross-border money transfer request from the sending entity and an authentication confirmation from the government authentication system;
sending a debit transaction message to the sending entity's issuing bank to debit at least the transfer amount from a sending entity account;
receiving verification of the debit transaction; and
sending a deposit transaction message to a recipient entity's issuing bank to deposit the transfer amount to a recipient entity account.

11. The system of claim 10 wherein the government operated authentication system receives a cross-border money transfer request message from the sending entity to transfer money to the recipient entity, and authenticates the cross-border money transfer request message by verifying that the recipient entity has a profile in a government identity database and resides in a nation operating the government authentication system.

12. The system of claim 10 wherein the method further comprises of authenticating the cross-border money transfer request message by verifying that the recipient entity is listed as a recipient under the sending entity's profile.

13. The system of claim 12 wherein the method further comprises of verifying that the recipient entity is a family member of the sending entity.

14. The system of claim 10 wherein the method further comprises of verifying that identifying information provided by the sending entity matches data in a profile for the sending entity in the government identity database.

15. The system of claim 10 wherein the method further comprises of verifying the money transfer request message by checking if the cross-border money transfer request exceeds velocity limits for the sending entity.

16. The system of claim 10 wherein the method further comprises of verifying the money transfer request message by checking if the cross-border money transfer request exceeds value limits for the transaction.

17. The system of claim 10 wherein if the recipient entity is unbanked, then the original credit transaction is not sent, and instead a prepaid card is delivered to the recipient entity.

18. The system of claim 10 wherein the method further comprises of verifying the money transfer request message by checking if the sending entity is blacklisted.

19. A non-transitory computer readable medium comprising code executable by a processor, for implementing a method comprising:
receiving a cross-border money transfer request message from a host bank, wherein a sending entity initiates the cross-border money transfer request by communicating an authentication request to a government authentication system, wherein after the sending entity is authenticated by the government authentication system, the government authentication system directs the sending entity to the host bank, wherein the host bank receives money transfer data comprising a transfer amount for the cross-border money transfer request from the sending entity and an authentication confirmation from the government authentication system;
sending a debit transaction message to the sending entity's issuing bank to debit at least the transfer amount from a sending entity account;
receiving verification of the debit transaction; and
sending a deposit transaction message to a recipient entity's issuing bank to deposit the transfer amount to a recipient entity account.

20. The computer readable medium of claim 19 wherein the government operated authentication system receives a cross-border money transfer request message from the sending entity to transfer money to the recipient entity, and authenticates the cross-border money transfer request message by verifying that the recipient entity has a profile in a government identity database and resides in a nation operating the government authentication system.

* * * * *